Aug. 14, 1928.
L. J. ROUSSELOT
1,680,637
HOLDER FOR TEAPOTS AND OTHER CONTAINERS
Filed March 18, 1927
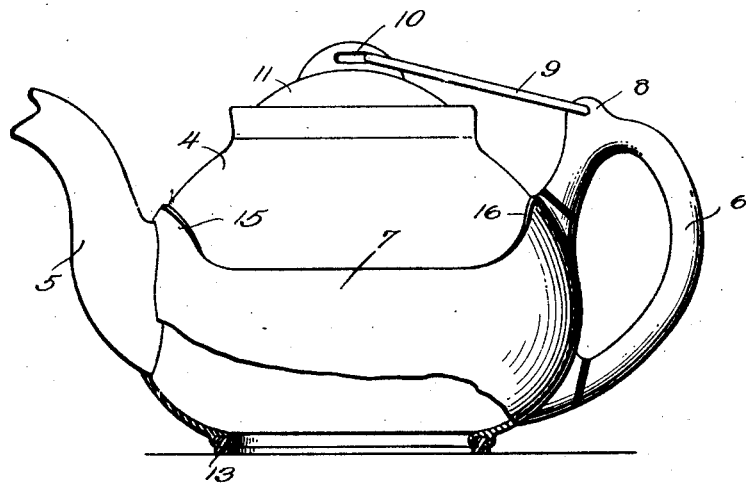
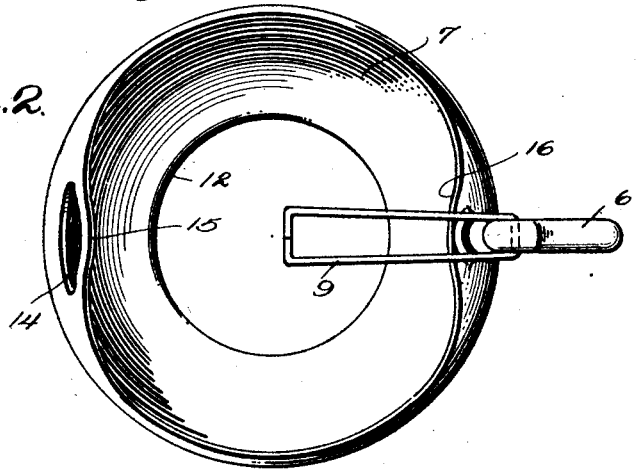
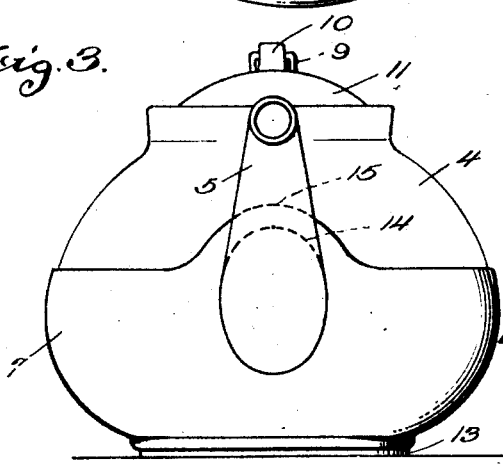
Inventor
Louis J. Rousselot,
C. P. Gospel
Attorneys Patented Aug. 14, 1928.

1,680,637

UNITED STATES PATENT OFFICE.

LOUIS J. ROUSSELOT, OF NEW YORK, N. Y.

HOLDER FOR TEAPOTS AND OTHER CONTAINERS.

Application filed March 18, 1927. Serial No. 176,405.

The present invention relates to improvements in holders for teapots and other containers, and has for an object to provide a handled holder for handleless containers.

The invention is particularly useful in connection with earthenware teapots in which the brewing of tea is particularly successful. It is a further object of the invention to provide in conjunction with an earthenware teapot without a handle, a metallic container adapted to slip readily over the lower portion of the teapot and having a handle by which the combined holder and teapot may be carried about, and further having an insulating support to permit of the assembled container and holder being placed upon tables or the like without marring the finish.

A further object of the invention is to provide a device of the character above indicated in which additionally the holder is arranged to carry a lid for the teapot.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view, partly in section, of a teapot and holder made in accordance with the present invention.

Figure 2 is a top plan view of the holder with the teapot removed, and

Figure 3 is a front elevation of the combined teapot and holder.

Referring more particularly to the drawings 4 designates an earthenware teapot or other container and 5 the pouring spout. The teapot is without any handle and it is adapted to be carried about by the handle 6 on the holder, which is designated generally at 7. The handle 6 is provided with a perforated horn or lug 8 to hingedly receive the wire link 9 engaging through the slot 10 of the teapot lid 11, whereby the teapot lid will always be carried by the holder and will be in readiness to close the container whenever such container occupies the holder.

The holder 7 is preferably composed of a thin resilient shell of metal or other appropriate material shaped to fit the lower portion of the teapot and preferably, though not necessarily, open at its base as indicated at 12; this for the purpose of permitting the seepage along the sides of the teapot passing out of the holder. Extending around the opening 12, or otherwise upon the base of the holder is a ring 13 of some heat insulating material. It is understood that any appropriate legs may be used to support the device. These legs and the ring are preferably of insulating material to avoid transferring the heat to the surface of the table.

The holder is also provided with an opening 14 for the spout 5, and this opening preferably extends up into one upwardly projecting portion 15 of the resilient holder 7. A second upwardly extending portion 16 of the holder is arranged diametrically opposite the portion 15. Both these upstanding portions have rounded upper walls, so that their highest points are diametrically opposite and substantially unsupported at the sides, so that they may flex considerably when placing the holder upon the teapot.

In accomplishing this operation the spout 5 is first introduced downwardly into the interior of the holder 7 and thence outwardly through the opening 14, the back portion of the teapot following into the holder, which is held distended by its handle 6. As the rounded walls of the teapot slip within the rounded container band 7, the resilient container will close about the pot and fit it snugly.

The heat of the earthenware pot will not be so quickly transferred to the handle as is the case with the handle of the old teapot. The holder acts as a protector for the teapot resisting jars and preventing breakage.

The holder will remain relatively cool, while the contents of the earthenware pot are maintained at a constant temperature. The device will avoid the breakage of earthenware handles of the pots which has heretofore rendered the pots useless.

I have illustrated and described a preferred and satisfactory embodiment of my invention, but it is obvious that changes may be made therein within the spirit and scope thereof as defined in the appended claims.

What is claimed is:—

1. A holder for a teapot having a spout comprising a shell shaped to conform to the lower portion of the teapot, and an upwardly extending resilient portion to engage the upper part of the teapot and having an opening adjacent said portion and a handle mounted on the shell at the rear thereof, said shell being adapted to permit the insertion of the teapot into the shell by the passage of the spout of the teapot through the opening of the shell so that the part of the shell around said opening encircles the spout, and to clampingly engage the teapot by means of said rear and said resilient portion.

2. A holder for a teapot having a spout comprising a metallic shell shaped to conform to the lower portion of the teapot, and having an opening at the front of the shell to receive the spout of the teapot and a handle on the shell at the rear of the shell, said shell being adapted to permit the insertion of the teapot into the shell by the passage of the spout of the teapot through the front opening so that the part of the shell around the opening encircles the spout.

3. A holder for a teapot having a spout comprising a resilient shell having spaced upstanding portions, the shell having a spout-receiving opening in one of the upstanding portions, and a handle carried by the shell on the opposite upstanding portion, and lateral connecting portions between the front and rear upstanding portions, all of said upstanding portions forming an integral part with the lateral portions.

4. In combination, a handleless teapot having a spout and a holder comprising a shell having an open base and an opening at the front thereof to receive the spout of the teapot, a handle at the rear of the shell, and an insulating support for the shell at the base, the shell being adapted to receive the body portion of the teapot by the insertion of the spout through the opening of the shell so that the front encircles the spout, and clamping the body of the teapot between the front and rear portions of the shell.

In testimony that I claim the foregoing as an invention, I have signed my name hereto.

LOUIS J. ROUSSELOT.